INVENTOR
JOHN M. WILSON

BY George H. Fisher
ATTORNEY

Patented Sept. 20, 1949

2,482,739

UNITED STATES PATENT OFFICE 2,482,739

AUTOMATIC STOKER MOTOR CONTROL RESPONSIVE TO SPACE AND COMBUSTION TEMPERATURE CONDITIONS

John M. Wilson, Minneapolis, Minn., assignor to Minneapolis-Honeywell Regulator Company, Minneapolis, Minn., a corporation of Delaware Application April 18, 1945, Serial No. 589,035

19 Claims. (Cl. 110—101)

1

The present invention is concerned with controlling apparatus and more particularly with such apparatus peculiarly adapted for the control of a stoker.

An object of the present invention is to provide improved stoker controlling apparatus of the type in which the stoker is not only controlled by an element responsive to room temperature but is also controlled by an element responsive to a temperature condition directly affected by combustion.

A further object of the invention is to provide such a system in which the element affected by the temperature of combustion is an impedance element forming the element of an impedance network, the unbalance voltage of which is employed to exert a controlling effect.

A still further object of the present invention is to provide such a system in which one impedance bridge is employed both to initiate operation of the stoker when the combustion chamber temperature is sufficiently low to indicate the need for the operation of the stoker motor and to prevent the combustion chamber temperature exceeding a higher limiting value when the stoker motor is being operated in response to the demand by a device responsive to the temperature of the space being heated.

A further object of the present invention is to provide such a stoker controlling arrangement in which means are provided to insure that while the stoker is being operated under the control of the impedance bridge responsive to combustion chamber temperature, the means responsive to the space temperature is rendered ineffective.

A still further object of the present invention is to provide in connection with a condition controlling apparatus, means for affecting the control point of an impedance bridge by means responsive to a second condition.

Other objects of the present invention will be apparent from a consideration of the accompanying specification, claims, and drawing, of which:

Figure 1:
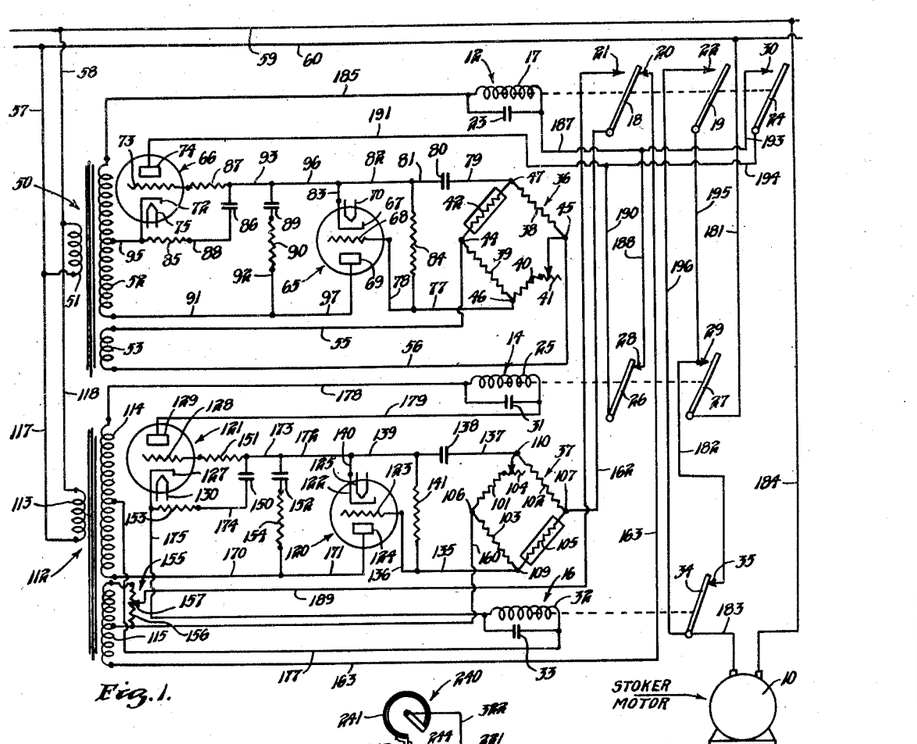
Figure 1 is a schematic view of one form of a stoker control system employing my improved stoker controlling apparatus.

Referring to the drawing, the reference numeral 10 is employed to indicate a stoker motor which it will be understood may form the motor for driving the fuel feeding apparatus and blower of a conventional stoker assembly.

Three relays 12, 14, and 16 are provided for controlling the energization of the stoker motor 10.

2

The relay 12 comprises a relay coil 17 and a plurality of switch blades 18, 19, and 24. Switch blade 18 is biased into engagement with contact 20. Switch blades 18 and 19 are adapted to be moved into engagement with contacts 21 and 22 upon energization of the relay coil 17. Switch blade 24 is biased out of engagement with a contact 30 and is moved into engagement with contact 30 upon energization of the relay coils. A condenser 23 is connected in parallel with winding 17 to smooth out the ripple in the current flowing through the relay energizing circuit.

The relay 14 likewise comprises relay coil 25 and a plurality of switch blades 26 and 27. Switch arm 26 is biased into engagement with contact 28, and switch blade 27 is adapted upon energization of coil 25 to be moved into engagement with contact 29. A condenser 31 is connected in parallel with relay coil 25 for the same purpose as condenser 23, namely, to smooth out the current flowing through relay coil 25.

The third relay 16 comprises a relay coil 32 and a condenser 33 connected in parallel with relay coil 32. The switch blade 34 is biased into engagement with contact 35 and is adapted to be moved out of engagement therewith upon energization of the relay coil 32.

The energization of relay 12 is controlled by an impedance bridge 36 and that of relays 14 and 16 by an impedance bridge 37. The impedance bridge 36 comprises a plurality of resistors 38, 39, and 40, a rheostat 41, and a temperature responsive variable resistor 42. The resistor 42 is adapted to be located in the space heated by the stoker and whose temperature is to be controlled. The junction 44 of resistors 39 and 42 constitutes one of the input terminals of the bridge, while the junction 45 of the variable resistor 41 and fixed resistor 38 constitutes the other input terminal. The remaining two junctions 46 and 47 constitute the output terminals. Energy is supplied to the bridge 36 by a step-up, step-down transformer 50. This transformer comprises a primary winding 51, a center tapped secondary winding 52, and a low voltage secondary winding 53. The primary winding 51 is connected by conductors 57 and 58, and line wires 59 and 60 leading to any suitable source of power, (not shown). The low voltage secondary winding 53 is connected through conductors 55 and 56 to junctions 44 and 45, respectively, which as previously noted constitute the input terminals of bridge 36.

It will be obvious that the bridge 36 is a conventional Wheatstone bridge, resistance 42 constituting the normally variable resistance of the bridge. The variable resistor 41 is varied only for adjustment purposes to control the temperature setting of the bridge. The output voltage appearing across terminals 46 and 47 is dependent upon the resistance value of the resistor 42 which in turn is dependent upon space temperature.

The output voltage between terminals 46 and 47 of bridge 36 is employed to control the energization of relay 12 through an amplifier consisting of two thermionic discharge tubes 65 and 66. The tube 65 comprises a cathode 67, a grid 68, and an anode 69. A heater 70 is associated with the cathode 67 and may be connected to any suitable source of power (not shown). The tube 66 comprises a cathode 72, a grid 73, and an anode 74. Again, the cathode 72 is provided with a heater element 75. The output terminal 46 of bridge 36 is connected by conductors 77 and 78 to grid 68 of tube 65. The output terminal 47 is connected through conductor 79, condenser 80, and conductors 81, 82, and 83 to the cathode 72. A resistor 84 is connected between the grid and cathode and acts as a coupling resistor between the bridge 36 and the grid and cathode of tube 65. The condenser 80 functions in the usual manner as a blocking condenser to prevent any direct current voltage from being impressed upon the input circuit of tube 65.

A resistor 85, a conductor 88, condenser 86, and a resistor 87 are connected in series between the grid 73 and the cathode 72 of tube 66. A further condenser 89 and resistor 90 are connected between the grid and cathode in a circuit including the lower portion of the secondary 52 of transformer 50, this circuit being as follows: from the lower terminal of secondary 52 through conductors 91 and 92, resistor 90, condenser 89, conductor 93, resistor 87, grid 73, cathode 72, and conductor 95 to the center tap of secondary 52. The anode 69 and cathode 67 of tube 65 are connected in parallel with the condenser 89 by conductors 83, 96, and 97. As will be more fully explained later, the tube 65 functions as a rectifier in parallel with condenser 89, the conductivity of the rectifier being dependent upon the voltage applied to grid 68 by bridge 36. The impedance of the rectifier tube 65 functions in turn to vary the voltage applied to grid 73 of tube 66. The conductivity of tube 66 controls the energization of relay coil 17 of relay 12, as will be more fully explained presently.

The impedance bridge 37, which controls the energization of relays 14 and 16, consists of three fixed resistors 101, 102, and 103, an adjustable resistor 104, and a temperature responsive resistor 105. The latter resistor is composed of some material having a relatively high temperature coefficient of resistance and is adapted to be located in the combustion chamber so that its resistance varies with combustion chamber temperature.

The junction 106 of resistors 101 and 103 constitutes one of the input terminals, while the junction 107 of resistors 102 and 105 constitutes the other input terminal. The junction 109 of resistors 103 and 105 constitutes one of the output terminals, while the junction 110 of resistors 104 and 102 constitutes the other output terminal. The bridge 37 is supplied with power by a second transformer 112 having a primary winding 113, a high voltage secondary 114, and a low voltage secondary winding 115. The primary winding 113 is connected by conductors 117, 57, 118, and 58 to line wires 59 and 60, previously referred to. The secondary 115 is connected to the input terminals of bridge 37 and is employed to energize bridge 37 with a voltage of one phase or of an opposite phase, depending upon the position of switch blade 18 of relay 12. The output voltage of bridge 37 as measured across terminals 109 and 110 is employed to control the energization of relays 14 and 16 by means of an amplifier consisting of two electron discharge tubes 120 and 121. The tube 120 consists of a cathode 122, a grid 123, and an anode 124. The cathode 122 is heated by an electrical heater 125 in the usual manner. The tube 121 likewise comprises a cathode 127, a grid 128, and an anode 129. The cathode 127 has associated therewith the usual thermionic heater 130.

The output terminal 109 is connected by conductors 135 and 136 to the grid 123. The other output terminal 110 is connected by conductor 137, condenser 138, and conductors 139 and 140 to cathode 122. Again, a coupling resistor 141 is connected between the grid 123 and cathode 122.

As with the amplifying arrangement associated with bridge 36, a resistor 153, a condenser 150, and a resistor 151 are connected in series between the grid and the cathode. Similarly, a resistor 154 and a condenser 152 are connected in series with the grid and cathode and the lower portion of the secondary 114. The cathode 123 and anode 124 of tube 120 are connected in parallel with condenser 152 and function to operate as a rectifying impedance in parallel with condenser 152.

A potentiometer 155 comprises a resistor 156 and a slider 157. The resistor 156 is connected across the upper portion of secondary 115.

Operation of Figure 1

The elements are shown in the position assumed when the temperature in the space being heated by the stoker fired furnace is at or above the desired value and the temperature of the combustion chamber is sufficiently high as to make unnecessary the feeding of coal to the furnace. Under these conditions, both bridges 36 and 37 are unbalanced sufficiently to apply an appreciable biasing voltage to the tubes 65 and 120 to which they are respectively connected. The polarity of this unbalanced voltage is such that during the half cycle in which anode 69 is positive with respect to cathode 67, the grid 68 is negative with respect to cathode 67. This condition arises when the resistor 42 has a resistance value substantially higher than that of resistor 38 so that the junction 47 tends to assume the potential of input terminal 45 which is of the same phase as the anode 69. Since the grid 68 is connected to the opposite terminal 46, it will be obvious that the voltage applied to grid 68 is opposite in phase with respect to that applied to the anode. Hence, the voltage applied by the bridge under these conditions is such as to tend to render the tube 65 substantially non-conductive. Under these conditions, current can flow between the grid 73 and cathode 72 of tube 66 only through the circuit traced through condenser 89. The effect of this current flow is to render grid 73 negative with respect to cathode 72. Considering the operation in a slightly different light, the effect of this connection is to connect the grid 73 through condenser 89 to a point on the secondary 52 which is 180 degrees displaced with respect to the upper terminal of the secondary 52 to which the anode 74 is effectively connected. Hence, under these conditions, no current will flow in tube 66.

Considering now the bridge 37, it is to be noted that the input terminal 106 is connected through conductor 160 to the intermediate tap of secondary 115. With the elements in the position shown, the other input terminal 107 is connected to the lower terminal of secondary 115 by a circuit extending as follows: from input terminal 107 through conductor 162, switch blade 18, contact 20, and conductor 163 to the lower terminal of secondary 115. The lower terminal of secondary 115 is in phase with the lower terminal of secondary 114. Thus with the resistor 105 having a resistance value greater than that of resistor 103, the unbalance voltage of bridge 37 as applied to grid 123 will be out of phase with respect to the voltage applied to anode 124. Hence, with the resistance of resistor 105 greater than that of resistor 103, as is the situation when the conditions described above are present, both tubes 120 and 121 will be substantially non-conductive in the same manner as pointed out above in connection with bridge 36 and tubes 65 and 66.

Now let it be assumed that the temperature in the combustion chamber drops to a point indicating the need for the addition of coal if it is to be assured that the stoker fire will not be extinguished. It is still assumed that the temperature of the space is at or above the desired value. Under these conditions, the resistance of resistor 105 exposed to the combustion chamber temperature will be lower than that previously considered so that the unbalance voltage referred to previously will be less in magnitude. This in turn will increase the conductivity of tube 120. The effect of this is to establish a circuit through the condenser 150 as follows: from the lower terminal of secondary 114, through conductors 170 and 171, anode 124, cathode 122, conductors 140, 172, and 173, condenser 150, conductor 174, resistor 153, conductor 175, relay winding 32, and conductor 177 to the center tap of secondary winding 114. The current will flow through this circuit only during the half cycle in which the anode 124 is positive with respect to the cathode 122. As a result, the condenser 150 which, as previously pointed out, is connected between the grid and cathode will have impressed across it a unidirectional voltage of such polarity that the upper terminal of condenser 150 tends to become positive with respect to the lower terminal. This overcomes the biasing effect previously discussed so as to raise the potential sufficiently to render tube 121 conductive to a sufficient extent to effectively energize relay 14. The energizing circuit for relay winding 25 of relay 14 is as follows: from the upper terminal of secondary 114 through conductor 178, relay winding 25, conductor 179, anode 129, cathode 127, conductor 175, relay winding 32 of relay 16, and conductor 177 to the center tap of secondary 114. It is to be noted that this circuit includes the windings of both relays 14 and 16. Only relay winding 14 is effectively energized, however, due to the fact that a considerably greater current flow through relay 16 is required to energize it. The energization of relay 25 causes switch blade 26 to move out of engagement with contact 28 and switch blade 27 into engagement with contact 29. The movement of switch blade 26 out of engagement with contact 28 prevents the energization of relay 12 if during the period of operation under the control of bridge 37, the space temperature should drop to a point such as to require operation of the stoker. Engagement of switch blade 27 with contact 29 results in a circuit being established to stoker motor 10 as follows: from line wire 60 through conductor 181, switch blade 27, contact 29, conductor 182, contact 35, switch blade 34, conductor 183, stoker motor 10, and conductor 184 to line wire 59. The establishment of the circuit just traced places the stoker into operation to supply coal and air to the furnace in the conventional manner. The operation of the stoker will normally continue until such time as the combustion chamber temperature has risen sufficiently to restore the resistance of resistor 105 to substantially the value which it assumed under the conditions first discussed. As far as this portion of the system is concerned, accordingly, the stoker will be brought into operation whenever it is necessary to maintain the combustion chamber temperature at a desired minimum value corresponding to the value which it is necessary to maintain to insure continued combustion.

If for any reason, the fire has been extinguished to the point at which it is impossible to rekindle it merely by operation of the stoker, the temperature of element 105 will continue to drop despite operation of the stoker. Under these conditions, the unbalance voltage will decrease still further so as to increase both the conductivity of tubes 120 and 121. The increase in conductivity of tube 121 will cause an increased current flow through relay coils 25 and 32. This increase in current flow will be sufficient to cause energization of relay 16 as well as relay 14. The energization of relay 16 will cause switch blade 34 to move out of engagement with contact 35 to interrupt the circuit previously traced. This will deenergize the stoker motor and the stoker motor will remain deenergized until the furnace has been rekindled by an operator.

Now let it be assumed that the temperature in the space being heated by the stoker fired furnace drops so as to decrease the resistance of resistor 42 and hence decrease the unbalance of bridge 35. When this happens, the unbalance voltage will no longer be sufficient to bias the tube 65 to the extent to which it was previously biased with the result that the conductivity of this tube will be increased. In the same manner as in connection with tube 121, a circuit will then be established through the tube 65 and condenser 86, this circuit extending from the lower terminal of secondary 52 through conductors 91 and 97, anode 69, cathode 67, conductors 83, 96, and 93, condenser 86, conductor 88, resistor 85, and conductor 95 to the center tap 95 of secondary 52. This circuit tends to render the upper terminal of condenser 86 positive with respect to the lower terminal. This in turn increases the conductivity of tube 66 to cause an increased current to flow through relay coil 17 as follows: from the upper terminal of secondary 52 through conductor 185, relay coil 17, conductors 187 and 188, contact 28, switch blade 26, conductors 190 and 191, anode 74, cathode 72, and conductor 95 to the center tap of secondary 52. The resultant energization of relay 12 as the result of the increased current flow through relay winding 17 causes switch blades 18, 19, and 24 to be moved into engagement with contacts 21, 22 and 30, respectively.

The movement of switch blade 24 into engagement with contact 30 results in the establishment of a holding circuit to relay coil 17 independently of switch blade 26, this circuit being as follows: from the upper terminal of secondary 52 through conductor 185, relay winding 17, conductors 187 and 193, contact 30, switch blade 24, conductors 194 and 191, anode 74, cathode 72, and conductor 95 to the center tap of secondary 52. The establishment of this circuit results in continued energization of relay coil 17 despite the subsequent disengagement of switch blade 26 from contact 28, as will be described.

The movement of switch blade 18 out of engagement with contact 20 and into engagement with contact 21 disconnects the lower terminal of secondary 115 from the input terminal 107 of bridge 37 and connects the tap 157 of potentiometer 156 to this input terminal through a circuit which extends as follows: from the tap 157 through conductor 189, contact 21, switch blade 18, and conductor 162 to input terminal 107. The disconnection of the lower terminal of secondary 115 and the connection of tap 157 to the input terminal 107 results in a reversal of the phase of the voltage applied to bridge 37. The effect of this is to cause a voltage in phase with the anode voltage of tube 120 to be applied between the grid and the cathode 122. The magnitude of this voltage depends upon the setting of tap 157. This will normally cause tube 120 to become substantially conductive to in turn cause tube 121 to become substantially conductive. Under these conditions, relay 14 and possibly relay 16 will be energized. The energization of relay 14 will cause switch blade 26 to move out of engagement with contact 28 and switch blade 27 to move into engagement with contact 29. While the movement of switch blade 26 out of engagement with contact 28 interrupts the energizing circuit to relay winding 17 of relay 12, previously traced, this has no effect upon the energization of relay winding 17 due to the existence of the holding circuit through relay switch blade 24 and contact 30.

The engagement of switch blade 27 with contact 29 results in the following circuit being established to the stoker motor 10: from the line wire 60 through conductor 181, switch blade 27, contact 29, conductor 195, switch blade 19, contact 22, conductors 196 and 183, stoker motor 10, and conductor 184 back to the other line wire 59. The establishment of the circuit just traced results in the stoker motor being energized independently of switch blade 34 and contact 35. Thus even though the relay 16 may be energized as a result of the reversal in power supplied to bridge 37, the stoker motor remains in operation as long as the space temperature to which element 42 of bridge 36 is subjected remains below the desired value.

The stoker operation resulting from the establishment of the circuit last traced will normally continue either until the space temperature rises above the desired value or until the furnace temperature rises to a limiting value. If the furnace temperature rises to a predetermined value beyond which it is not desired to have stoker operation, the increase in the resistance of resistor 105 will be so great as to again unbalance the bridge in the same direction as was the case under the conditions first described in connection with the operation of the system. In other words, under these conditions, the unbalance will be such as to bias grid 123 during the conductive half cycle of tube 120 to such a point that the tube is substantially non-conductive. This will result in deenergization of relay 14 and movement of switch blades 26 and 27 to the position shown in which switch blade 27 is separated from switch blade 29. Since switch blade 27 is in all of the stoker motor energizing circuits which have been traced, it will be obvious that the separation of switch blade 27 from contact 29 will result in deenergization of the stoker motor. This deenergization will continue until the temperature of the furnace has dropped below the limiting value. If at this time the relay 12 controlled in accordance with the space temperature is still energized, stoker operation will resume until the space temperature has either risen to the desired value or until the limiting temperature in the furnace is again reached. The value of this limiting temperature is determined by the setting of tap 157.

In tracing the energizing circuit to relay coil 17, mention was made of the fact that the original energizing circuit included switch blade 26 and contact 28 of relay 14 whereas as soon as relay 17 was pulled in, a holding circuit was established for the relay independent of switch blade 26. The reason for this arrangement is that if some provision were not made for preventing relay 12 from pulling in while relay 14 were energized, the benefit of any protection in the event of the extinguishment of fire would be eliminated. Under such circumstances, an extinguishment of the fire would finally result in a drop in room temperature with the result that relay 12 would pull in to cause motor 10 to be placed into operation regardless of whether prior to the drop in space temperature, the out fire relay 16 were already energized. As was pointed out above, when relay 12 controlled by space temperature is energized, the burner motor is energized independently of out fire relay 16. It is thus desirable that means be provided for preventing relay 12 from being energized when the relay 14 is already energized.

Figure 2:
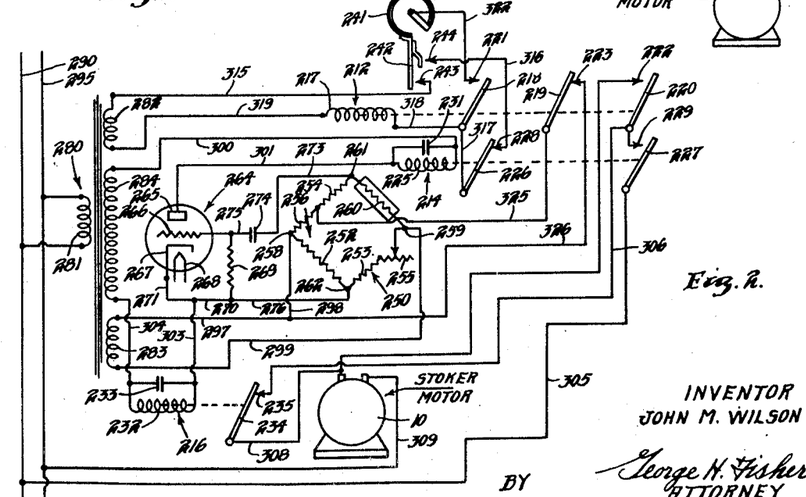
Figure 2 is a schematic view of a modified form of a stoker controlling system.

*Species of Figure 2*

In Figure 2 I have shown a somewhat simpler form of the system of Figure 1. In the first place, I have substituted a conventional room thermostat and a relay for the resistance bulb thermostat 42 and the necessary amplifiers. In the second place, instead of reversing the connections of the power supply to the furnace temperature responsive bridge, I simply complete a shunt around a portion of the resistance in one of the arms of the bridge. This likewise affects the balance of the bridge to change the effective temperature setting thereof.

Referring to Figure 2, the reference numeral 10 is again employed to indicate the stoker motor, it being understood that this motor may be identically the same as that of motor 10 of Figure 1. The energization of the motor is controlled by a plurality of relays 212, 214, and 216. The relay 212 comprises a relay coil 217 and a plurality of switch blades 218, 219, and 220. Switch blades 218 and 219 are biased to the right and are adapted upon energization of the relay winding 217 to be moved into engagement with contacts 221 and 222, respectively. Switch blade 219 is biased into engagement with contact 223 and is adapted to be moved out of engagement therewith upon energization of the relay.

Relay 214 comprises a relay coil 225 and a plurality of switch blades 226 and 227. Switch blade 226 is biased into engagement with contact 228, while the switch blade 227 is biased out of engagement with contact 229. Upon energization of relay coil 225 sufficiently, switch blade 226 is moved out of engagement with its associated contact 228 and switch blade 227 is moved into engagement with contact 229. A condenser 231 is connected in parallel with relay winding 225 in order to bypass the A. C. component of the current flowing through the circuit in which relay winding 225 is included.

The relay 216 comprises a relay coil 232 and a switch blade 234 which is biased into engagement with a contact 235. Upon energization of relay coil 232, switch blade 234 is moved out of engagement with contact 235. A condenser 233 is connected in parallel with relay winding 232 to bypass the alternating current component of the current flowing through the circuit including relay winding 232.

The energization of relay 212 is controlled by a room thermostat 240. This room thermostat comprises a bimetallic element 241 to which is secured a contact blade 242. The contact blade is adapted to cooperate with fixed contacts 243 and 244. The contact 244 is more widely spaced from switch blade 242 than is contact 243, and the bimetallic element 241 is so disposed that upon a drop in space temperature the switch blade 242 is moved to the right to first engage contact 243 and then, upon a substantial drop in temperature, to engage contact 244.

The energization of relays 214 and 216 is controlled by a resistance bridge 250. This bridge includes fixed resistors 252, 253, and 254, all of which have a substantially negligible temperature coefficient of resistance. Connected in series with resistor 253 is a variable resistor 255 and connected in series with resistor 254 is a variable resistor 256. Also included in the bridge is a resistor 260 which has a relatively high coefficient of resistance and is adapted to be located where it is directly affected by the combustion chamber temperature. The bridge 250 and the temperature responsive element 260 are similar in function to bridge 37 and temperature responsive element 105 of the species of Figure 1. The junction of resistors 252 and 256 is designated by the reference numeral 258 and the junction of variable resistors 255 and 256 by the numeral 259. Junctions 258 and 259 constitute the input terminals of bridge 250. The junction 261 of resistors 254 and 260 and junction 262 of resistors 252 and 253 constitute the output terminals of the resistance bridge.

It is necessary to employ an amplifier between the output terminals of bridge 250 and relay 214. This amplifier may well be of the same type as that shown in Figure 1 between the bridges 36 and 37 and the respective relays controlled by them. For purposes of simplicity, however, I have shown merely a single tube amplifier in connection with the arrangement of Figure 2. This amplifier comprises a single thermionic discharge tube 264 having an anode 265, a grid 266, and a cathode 267. Associated with the cathode is a cathode heater 268 which is connected to any suitable source of power (not shown). A resistor 269 is connected between the grid 266 and cathode 267 by conductors 270 and 271. The output terminal 261 of bridge 250 is connected by a conductor 273, blocking condenser 274 and conductor 275 to the grid 266. The other output terminal 262 of bridge 250 is connected by conductors 276, 270, and 271 to the cathode 267. The output of bridge 250 is thus impressed upon grid 266.

A transformer 280 is employed for supplying power to the variable relays of Figure 2. This transformer comprises a primary winding 281, low voltage secondary windings 282 and 283, and a high voltage secondary winding 284. Primary winding 281 is connected to line wires 290 and 295 leading to any suitable source of power (not shown). The secondary 282 is employed for energizing the relay winding 217 of relay 212 under the control of thermostat 240, as will be presently described. The low voltage winding 283 is connected by conductors 297, 298, and 299 to the opposite input terminals 258 and 259 of bridge 250. The high voltage secondary 284 is employed for energizing the relays 214 and 216 through the electronic discharge tube 264, the anode 256 being connected to the upper terminal of secondary 284 and the cathode 267 to the lower terminal of secondary 284.

*Operation of species of Figure 2*

The arrangement of Figure 2 is shown in the position which it assumes when there is no call for stoker operation either by the room thermostat 240 or by the resistance bridge 250. Let it now be assumed that the temperature of the combustion chamber drops to a value at which there is danger of extinguishment of the fire unless there is a stoker operation. Until this occurs, the bridge 250 is unbalanced in such a direction as to supply a sufficient alternating biasing voltage to grid 266 to prevent tube 264 from being sufficiently conductive to effectively energize either relay 214 or relay 216. The effect of the decrease in combustion chamber temperature is to decrease the resistance of resistor 260 to reduce the unbalance of bridge 250. This reduces the biasing voltage applied to grid 266 to increase the conductivity of tube 264 to a point where sufficient current flows through relay 214 to effectively energize the same. The path of this current flow is as follows: from the upper terminal of secondary 284 through conductor 300, relay winding 225, conductor 301, anode 265, cathode 267, conductors 271 and 303, relay winding 232, and conductor 304 to the lower terminal of secondary 284. The magnitude of this current is sufficient to cause effective energization of relay 214 but not of relay 216. The energization of relay 214 causes switch blade 226 to move out of engagement with contact 228 and switch blade 227 to be moved into engagement with contact 229. The movement of switch blade 226 out of engagement with contact 228 prevents the energization of relay winding 217 in very much the same manner as relay winding 17 was prevented from being energized in Figure 1 by the separation of switch blade 26 from contact 28. The engagement of switch blade 227 with contact 229 results in the establishment of an energizing circuit to stoker motor 107 as follows: from line wire 290 through conductor 305, switch blade 227, contact 229, conductor 306, contact 235, switch blade 234, conductor 308, stoker motor 10, and conductor 309 back to the other line wire 295.

As a result of the establishment of the circuit just traced, motor 10 is placed in operation and will continue in operation until the temperature of the combustion chamber has risen above the value at which operation of the stoker is necessary to keep the fire from being extinguished. Just as with the arrangement of Figure 1, a rise in this combustion chamber temperature increases the resistance of resistor 260, thereby again increasing the unbalance voltage of bridge 250 to increase the biasing voltage applied to grid 266. This will cause deenergization of relay 214 and a resultant interruption of the energization of stoker motor 10.

If by any chance, the coal has already become completely extinguished by the time that relay 214 is energized, there will be no rise in combustion chamber temperature. Instead, the combustion chamber temperature will continue to drop despite operation of the stoker motor. This will cause an increased reduction in the unbalance of bridge 250 with the resultant continued decrease in the biasing voltage applied to tube 264. The effect of this is a continued increase in the current flowing through the relay windings 225 and 232 of relays 214 and 216 until the current flowing through winding 232 is sufficient to effectively energize the relay. When this happens, switch blade 234 is moved out of engagement with contact 235 to interrupt the circuit to stoker motor 10. As a result, the stoker motor is placed out of operation and will remain out of operation until the fire is rekindled.

Now let it be assumed that there is a demand for operation of the stoker motor by the space temperature thermostat 240. If upon a drop in space temperature, switch blade 242 successively engages contacts 243 and 244, nothing more happens until the switch blade engages both sets of contacts, whereupon a circuit is established to relay winding 217 as follows: from the upper terminal of secondary 282 through conductor 315, contact 243, switch blade 242, contact 244, conductor 316, contact 228, switch blade 226, conductors 317 and 318, relay coil 217, and conductor 319 to the lower terminal of secondary 282. It is to be noted that this circuit includes switch blade 226 and contact 228 of relay 214 and thus can be established only when relay 214 is deenergized. Assuming the relay to be deenergized, the circuit just traced results in the effective energization of relay 212 to cause switch blades 218 and 220 to move into engagement with contacts 221 and 222 and to cause switch blade 219 to move out of engagement with contact 223.

The movement of switch blade 218 into engagement with contact 221 establishes a holding circuit for relay winding 217 as follows: from the upper terminal of secondary 282 through conductor 315, contact 243, switch blade 242, bimetallic element 241, conductor 322, contact 221, switch blade 218, conductor 318, relay winding 217, and conductor 319 to the lower terminal of secondary winding 282. It will be noted that this holding circuit just traced is independent both of relay switch blade 226 and also of thermostat contact 244. By reason of the new circuit being independent of switch blade 226 and contact 228, the circuit is not interrupted upon a subsequent energization of relay 214 taking place. The fact that the holding circuit is independent of thermostat contact 244 insures that the relay winding 217 will remain energized until the temperature has risen sufficiently to cause separation of switch blade 242 from contact 243, the last to be disengaged of the two contacts. By requiring that both sets of contacts close until relay 217 is energized and by maintaining the relay energized until both sets of contacts have separated, it is assured that there will be no chattering of the relays.

The movement of switch blade 219 out of engagement with contact 223 results in an interruption in the shunt around variable resistor 256, this shunt being as follows: from the right-hand terminal of resistor 256 through conductor 325, switch blade 219, contact 223, and conductors 326 and 298 back to the left-hand terminal of resistor 256. The effect of this shunt is that during the entire operation of the bridge with relay 212 deenergized, resistor 256 was completely shunted out of the bridge. As soon as this shunt is interrupted by reason of the separation of switch blade 219 from contact 223, the resistor 256 is effectively placed into the upper left-hand arm of the bridge. This is equivalent to a substantial increase in the resistance of this leg of the bridge, the amount of increase being adjusted by adjustment of variable resistor 256. An increase in the upper left-hand leg of the bridge is equivalent to a reduction in the resistance of the upper right-hand leg of the bridge containing the temperature responsive resistor 260. In other words, the interruption of the shunt around resistor 256 has the same effect as though the resistor 256 were subjected to a substantial drop in combustion chamber temperature. As a result, relay 214, and possibly relay 216 depending upon the then existing combustion chamber temperature, is effectively energized. The energization of relay 214 causes switch blade 226 to be moved out of engagement with contact 228 and switch blade 227 to be moved into engagement with contact 229.

The movement of switch blade 227 into engagement with contact 229 results in the establishment of an energizing circuit to stoker motor 10 as follows: from the line wire 290 through conductor 305, switch blade 227, contact 229, switch blade 220, contact 222, conductor 330, stoker motor 10, and conductor 309 to the other line wire 295.

The resultant energization of the stoker motor normally will continue until the room temperature has risen sufficiently to cause separation of switch blade 242 from both contacts 243 and 244. When this happens relay 212 is deenergized to interrupt the circuit just traced.

If, however, the combustion chamber temperature does rise above a limiting value before the room thermostat 240 is satisfied, the resultant increase in the resistance of resistor 260 will more than offset the effect of the insertion of resistor 256 into the upper left-hand leg of the bridge. As a result, the unbalance of the bridge will again be sufficient in magnitude to bias the tube 264 to such an extent as to effectively deenergize relay 214. When this happens, switch blade 227 will separate from contact 229, interrupting all circuits to stoker motor 10.

It will thus be seen that the arrangement of Figure 2 accomplishes the same general functions as that of Figure 1. In each case, the resistance bulb bridge controlling the relay designed to initiate fire maintaining operations is shifted in setting upon a call for heat by the room thermostat so as to function as a high limit controller to prevent excessively high combustion chamber temperatures. In each case, while there is an out-fire controller whose setting is also shifted upon a call for space temperature, means are provided to prevent this out-fire controller from interfering with a normal call for stoker operation by the space thermostat.

While in the arrangement of Figure 1, I have shown a resistance bulb bridge and amplifier for controlling one of the relays in accordance with the space temperature and in Figure 2 I have shown a room thermostat for controlling the relay, it is to be understood that as far as the present invention is concerned the resistance bulb and amplifier arrangement might be employed in Figure 2 or the thermostat in Figure 1. In general, while I have shown specific embodiments of my invention, it is to be understood that this is for purposes of illustration and that my invention is to be limited only by the scope of the appended claims.

I claim as my invention:

1. In apparatus for controlling a stoker motor associated with a stoker fired furnace, an impedance network including a source of power and a combustion responsive impedance element, an amplifier connected to the output terminals of said network, motor controlling means including a relay controlled by said amplifier for causing operation of the stoker motor whenever the impedance of the combustion responsive element of said network changes beyond a first predetermined value, and further responsive means connected in circuit controlling relationship with said impedance network and said motor control means to initiate automatic operation of said motor controlling means upon a condition indicative of the need for operation of said motor controlling means.

2. In apparatus for controlling a stoker motor associated with a stoker fired furnace, an impedance network including a source of power and a combustion responsive impedance element, an amplifier connected to the output terminals of said network, motor controlling means including a relay controlled by said amplifier for causing operation of the stoker motor whenever the impedance of the combustion responsive element of said network changes beyond a first predetermined value, means automatically operative upon a change of a further condition indicative of the need of operation of said motor controlling means, and means connecting said last named means in circuit controlling relationship with said impedance network and said motor controlling means when the impedance of the element of said network is not beyond said first predetermined value to maintain said motor controlling means operative until the impedance of the element of said network exceeds a second predetermined value.

3. In apparatus for controlling a stoker motor associated with a stoker fired furnace, an impedance network including a source of power and a combustion responsive impedance element, an amplifier connected to the output terminals of said network, motor controlling means including a relay controlled by said amplifier for causing operation of the stoker motor whenever the impedance of the combustion responsive element of said network changes beyond a first predetermined value, and means automatically operative upon a change of a further condition indicative of the need of operation of said motor controlling means to so alter the output voltage of said impedance network when the impedance of the combustion responsive element of said network is not beyond said first predetermined value that said motor controlling means is rendered operative and maintained operative as long as the impedance of said element is not beyond a second predetermined value.

4. In apparatus for controlling a stoker motor associated with a stoker fired furnace, an impedance bridge having four impedance arms connected to provide input and output terminals, one of said arms including a combustion responsive impedance element, a source of power connected to the input terminals of said bridge, motor controlling means including a relay controlled by the voltage across the output terminals of said bridge operative to energize a stoker motor whenever the impedance of the element of said bridge is within a first predetermined range, means automatically operative upon a change of a further condition indicative of the need for operation of said motor controlling means, and means connecting said last named means in circuit controlling relationship to said bridge to change the output of said bridge when the impedance of the element of said bridge is within a second range of values.

5. In apparatus for controlling a stoker motor associated with a stoker fired furnace, an impedance bridge having four impedance arms connected to provide input and output terminals, one of said arms including a combustion responsive impedance element, a source of power connected to the input terminals of said bridge, motor controlling means including a relay controlled by the voltage across the output terminals of said bridge operative to energize a stoker motor whenever the impedance of the element of said bridge is within a first predetermined range, means automatically operative upon a change of a further condition indicative of the need for operation of said motor controlling means, and means connecting said last named means to said bridge to vary the effective impedance of one arm of said bridge when the impedance of the element of said bridge is within a second range of values.

6. In apparatus for controlling a stoker motor associated with a stoker fired furnace, an impedance bridge having four impedance arms connected to provide input and output terminals, one of said arms including an impedance element whose impedance varies with heat of combustion, a source of power connected to the input terminals of said bridge, motor controlling means including a relay controlled by the voltage across the output terminals of said bridge operable to initiate operation of the motor when the impedance of the element of said network is within a first predetermined range, means automatically operative upon a change of a further condition indicative of the need for operation of said motor controlling means connected to change the output voltage of said bridge and render said motor controlling means operative as long as the impedance of the element of said network is within a first predetermined range of values, further relay means connected in circuit with said motor controlling means to prevent said last named means from being operative when the impedance of the element of said network is within a second predetermined range of values, and limiting means in circuit with said motor controlling means to render said motor controlling means inoperative when the impedance of the element of said network is within a third predetermined range of values.

7. In controlling apparatus for a stoker motor associated with a stoker fired furnace, a normally unbalanced impedance network having input and output terminals and including an impedance element whose impedance varies with the heat of combustion, a source of power, connections between said source of power and said input terminals of said network, motor controlling means including a relay energized in accordance with the direction and extent of the unbalance voltage of said network for causing operation of a stoker motor whenever the temperature adjacent said impedance element drops below a first predetermined value at which operation of the stoker motor would be necessary to maintain a fire, and means automatically responding to a further condition indicative of the need for operation of said stoker motor for reversing the connections between said source of power and and said input terminals of said network so as to reverse the polarity of the unbalance voltage so that said motor controlling means is rendered operative and maintained operative as long as the temperature of said element is below a higher predetermined value or until said further condition assumes a value at which motor operation is no longer needed.

8. In condition controlling apparatus, a normally unbalanced impedance bridge having a plurality of impedance arms connected to provide input and output terminals, one of said arms including an impedance element whose impedance varies with a first controlling condition to vary the unbalance of the bridge, a source of power, connections between said source of power and the input terminals of said bridge, means responsive to the voltage across the output terminals of said bridge and effective to exert a controlling effect dependent upon the character of the output voltage, and means responsive to a second controlling condition for reversing the connections between said source of voltage and said input terminals to reverse the direction of the unbalance voltage of the bridge.

9. In controlling apparatus for a stoker motor associated with a stoker fired furnace, an impedance bridge having four impedance arms connected to provide input and output terminals, one of said arms including an impedance element whose impedance varies with temperature of the heat of combustion, a source of power connected to the input terminals of said bridge, motor controlling means including a relay controlled by the voltage across the output terminals of said bridge for causing operation of the stoker motor whenever the temperature adjacent said impedance element drops below a first predetermined value at which operation of the stoker motor would be necessary to maintain a fire, and means automatically responsive to a further condition indicative of the need for operation of the stoker motor connected to vary the effective value of the impedance in an arm of said bridge to change the output voltage of said bridge existing when said impedance element is subjected to a predetermined temperature value so that said motor controlling means is placed in operation and maintained in operation as long as the temperature of said element is below a second predetermined value or until said further condition assumes a value at which motor operation is no longer needed.

10. In stoker controlling apparatus, first and second switches connected in series and adapted to control the energization of a stoker motor, switch operating means for operating said first and second switches, said switch operating means including an element adapted to be associated with a stoker fired furnace in such a manner as to be affected by the heat of combustion, said switch operating means being effective when said element is subjected to a temperature lower than a first fire maintaining value to cause closure of said first switch and when said element is subjected to a lower temperature indicative of the complete extinguishment of the fire to open said second switch, and means including a device adapted to respond automatically to a further condition indicative of the need for operation of the stoker and connected in circuit controlling relationship with the said switch means to vary the action of said switch operating means to cause said first and second switches to be operated at higher temperatures and to close a third switch in parallel with said second switch.

11. In stoker controlling apparatus, first and second switches connected in series and adapted to control the energization of a stoker motor, switch operating means for operating said first and second switches, said switch operating means including an element adapted to be asosciated with a stoker fired furnace in such a manner as to be affected by the heat of combustion, said switch operating means being effective when said element is subjected to a temperature lower than a first fire maintaining value to cause closure of said first switch and when said element is subjected to a lower temperature indicative of the complete extinguishment of the fire to open said second switch, means including a device adapted to respond automatically to a further condition indicative of the need for operation of the stoker and connected to vary the action of said switch operating means to cause said first and second switches to be operated at higher temperatures, and means including one of said switches connected in circuit controlling relation to the energizing circuit of the motor to prevent said last named means from operating to vary the action of said switch operating means when the temperature of said element is lower than said fire maintaining value.

12. In stoker controlling apparatus, relay means including first and second switches connected in series and adapted to control the energization of a stoker motor, said relay means being effective upon a continuous increase in the energization thereof to cause first closure of said first switch and then opening of said second switch, controlling means for controlling the energization of said relay means including an impedance bridge having an impedance element adapted to be associated with a stoker fired furnace in such a manner as to be affected by the heat of combustion, said controlling means being effective when said element is subjected to a temperature lower than a first fire maintaining value to cause energization of said relay means sufficiently to cause closure of said first switch and when said element is subject.d to a lower temperature indicative of the complete extinguishment of the fire to cause energization of said relay means sufficiently to open said second switch, and means including a device adapted to respond automatically to a further condition indicative of the need for operation of the stoker and connected in circuit controlling relation with said bridge to affect the balance of the impedance bridge to cause said first and second switches to be operated at higher temperatures and to close a third switch in parallel with said second switch.

13. In stoker controlling apparatus, relay means including first and second switches connected in series and adapted to control the energization of a stoker motor, said relay means being effective upon a continuous increase in the energization thereof to cause first closure of said first switch and then opening of said second switch, controlling means for controlling the energization of said relay means including an impedance bridge having an impedance element adapted to be associated with a stoker fired furnace in such a manner as to be affected by the heat of combustion, said controlling means being effective when said element is subjected to a temperature lower than a first fire maintaining value to cause energization of said relay means sufficiently to cause closure of said first switch and when said element is subjected to a lower temperature indicative of the complete extinguishment of the fire to cause energization of said relay means sufficiently to open said second switch, and electrically operated means including a device adapted to respond automatically to a further condition indicative of the need for operation of the stoker and effective to affect the balance of the impedance bridge to cause said first and second switches to be operated at higher temperatures and to close a third switch in parallel with said second switch, said relay means including a further switch in series with said electrically operated means and opened when said first switch is closed to prevent operation of said electrically operated means when the temperature of said element is lower than said fire maintaining value.

14. In stoker controlling apparatus, a first relay having a first switch and a second relay having a second switch, said first and second switches being connected in series and adapted to control the energization of a stoker motor, controlling means for controlling the energization of said first and second relays, said controlling means including impedance bridge means having a temperature responsive impedance element adapted to be associated with a stoker fired furnace in such a manner as to be affected by the heat of combustion and electronic amplifier means interposed between said bridge means and said first and second relays, said controlling means being effective when the temperature adjacent said element is lower than a first fire maintaining value to so affect the energization of said first relay as to cause closure of said first switch and when the temperature adjacent said element is at a lower value indicative of the complete extinguishment of the fire to so affect the energization of said second relay as to cause said second switch to be opened, and means including a device adapted to respond automatically to a further condition indicative of the need for operation of the stoker and connected in circuit controlling relation to said bridge to vary the unbalance of at least a portion of said bridge means so as to vary the value of the temperature at which said first switch is operated.

15. In condition controlling apparatus, a normally unbalanced impedance bridge having a plurality of impedance arms connected to provide input and output terminals, one of said arms including an impedance element whose impedance varies with a first controlling condition to vary the unbalance of the bridge, a source of power, connections between said source of power and the input terminals of said bridge, means responsive to the voltage across the output terminals of said bridge and effective to exert a controlling effect dependent upon the character of the output voltage, means responsive to a second controlling condition for reversing the connections between said source of voltage and said input terminals to reverse the direction of the unbalance voltage of the bridge, and means for adjustably varying the magnitude of the reversed unbalance voltage for any given value of said first controlling condition without affecting the normal unbalance voltage for the same value of said first condition.

16. In a control for a stoker fired furnace in combination, an electrical network having a source of power and output terminals, said network including a resistor whose resistance varies in accordance with changes in temperature of the furnace and varies the voltage on said output terminals in accordance with temperature changes within the furnace, relay means operable when energized to initiate the feeding of fuel to the furnace, detecting means connected to said output terminals and responsive to the voltage thereon, said detecting means being operable to energize said relay means when the temperature of said resistance drops below a predetermined value and a first voltage appears on said output terminals indicating a need for operation of the furnace and operable when a second voltage appears on said output terminals to deenergize said relay means, and means including switch means operable to alter the output voltage of said network upon a need for operation of the furnace to a third voltage such that said relay means will be operative until the temperature of said resistor has increased sufficiently that said second voltage appears on said output terminals or said means is no longer operative.

17. In a control for a stoker fired furnace, the combination comprising, a first resistor, said resistor having its resistance varied in accordance with the fire temperature of the furnace, a second resistor, a source of power, means connecting said first and second resistors in series to said source of power, further resistors connected to said source of power, all of said resistors and said source of power comprising a complex electrical network, output terminals for said network including the junction of said first and second resistors and a point in the connection of said further resistors, said output terminals having a voltage thereon which is varied in accordance with changes in resistance of said first resistor, relay means operable when energized to initiate the feeding of fuel to the burner, detecting means connected to said output terminals and responsive to the voltage thereon, said detecting means being operable to energize said relay means when the temperature of said first resistance drops below a predetermined value and a first voltage appears on said output terminals indicating a need for operation of the furnace and operable when the temperature of said first resistor increases and a second voltage appears on said output terminals to deenergize said relay means, and means including switch means operable to alter the connection of said further resistors to said source of power so that a third voltage will appear on said output terminals and said relay means will be operative until the temperature of said first resistor has increased sufficiently that said second voltage appears on said output terminals or said switch means is no longer operative.

18. In a control for a stoker fired furnace in combination, an electrical network having a source of power and output terminals, said network including a resistor whose resistance varies in accordance with changes in temperature of the furnace and varies the voltage on said output terminals in accordance with temperature changes within the furnace, relay means operable when energized to initiate the feeding of fuel to the furnace, electronic amplifier means connected to said output terminals and responsive to the voltage thereon, said electronic amplifier means being operable to energize said relay means when the temperature of said resistance drops below a predetermined value and a first voltage appears on said output terminals indicating a need for operation of the furnace and operable when a second voltage appears on said output terminals to deenergize said relay means, and means including switch means operable to alter the output voltage of said network upon a need for operation of the furnace to a third voltage such that said relay means will be operative until the temperature of said resistor has increased sufficiently that said second voltage appears on said output terminals or said means is no longer operative.

19. In a control for a stoker fired furnace, the combination comprising, a first resistor, said resistor having its resistance varied in accordance with the fire temperature of the furnace, a second resistor, a source of power, means connecting said first and second resistors in series to said source of power, further resistors connected to said source of power, all of said resistors and said source of power comprising a complex electrical network, output terminals for said network including a junction of said first and second resistors and a point in the connection of said further resistors, said output terminals having a voltage thereon which is varied in accordance with changes in resistance of said first resistor, relay means operable when energized to initiate the feeding of fuel to the burner, electronic amplifier connected to said output terminals and responsive to the voltage thereon, said electronic amplifier being operable to energize said relay means when the temperature of said first resistance drops below a predetermined value and a first voltage appears on said output terminals indicating a need for operation of the furnace and operable when the temperature of said first resistor increases and a second voltage appears on said output terminals to deenergize said relay means, and means including switch means operable to alter the connection of said further resistors to said source of power so that a third voltage will appear on said output terminals and said relay means will be operative until the temperature of said first resistor has increased sufficiently that said second voltage appears on said output terminals or said switch means is no longer operative.

JOHN M. WILSON.

REFERENCES CITED

The following references are of record in the file of this patent:

UNITED STATES PATENTS

| Number | Name | Date |
|---|---|---|
| 2,196,687 | Steinfeld | Apr. 9, 1940 |
| 2,304,188 | McGrath | Dec. 8, 1942 |
| 2,308,318 | Sparrow | Jan. 12, 1943 |
| 2,318,012 | Pond | May 4, 1943 |